United States Patent
Young et al.

(10) Patent No.: US 10,326,165 B2
(45) Date of Patent: Jun. 18, 2019

(54) SILICON-BASED SOLID ELECTROLYTE FOR RECHARGEABLE BATTERY

(71) Applicant: BASF Corporation, Florham Park, NJ (US)

(72) Inventors: Kwo Young, Troy, MI (US); Tiejun Meng, Novi, MI (US); Jean Nei, Southgate, MI (US); Diana Wong, Sterling, MI (US)

(73) Assignee: BASF Corporation, Florham Park, NJ (US)

( * ) Notice: Subject to any disclaimer, the term of this patent is extended or adjusted under 35 U.S.C. 154(b) by 43 days.

(21) Appl. No.: 15/451,485

(22) Filed: Mar. 7, 2017

(65) Prior Publication Data
US 2017/0279154 A1   Sep. 28, 2017

Related U.S. Application Data

(60) Provisional application No. 62/313,835, filed on Mar. 28, 2016.

(51) Int. Cl.
*H01M 10/05* (2010.01)
*H01M 2/30* (2006.01)
(Continued)

(52) U.S. Cl.
CPC ......... *H01M 10/0562* (2013.01); *H01M 2/30* (2013.01); *H01M 4/02* (2013.01); *H01M 4/0404* (2013.01); *H01M 4/0407* (2013.01); *H01M 4/131* (2013.01); *H01M 4/136* (2013.01); *H01M 4/1391* (2013.01); *H01M 4/1397* (2013.01); *H01M 4/364* (2013.01); *H01M 4/386* (2013.01); *H01M 4/502* (2013.01); *H01M 4/58* (2013.01); *H01M 4/60* (2013.01); *H01M 4/661* (2013.01); *H01M 10/05* (2013.01); *H01M 10/0585* (2013.01); *H01M 10/347* (2013.01); *H01M 4/0421* (2013.01); *H01M 2004/027* (2013.01); *H01M 2004/028* (2013.01); *H01M 2300/0068* (2013.01)

(58) Field of Classification Search
CPC ............................................. H01M 2300/0065
See application file for complete search history.

(56) References Cited

U.S. PATENT DOCUMENTS 4,111,689 A   9/1978   Liu
4,160,014 A   7/1979   Gamo et al.
(Continued)

FOREIGN PATENT DOCUMENTS

| JP | 2004-146297 A | 5/2004 |
|----|---------------|--------|
| JP | 2015-191778 A | 11/2015 |
| WO | 2016178957 A1 | 11/2016 |

OTHER PUBLICATIONS

International Search Report and Written Opinion for PCT Patent Application No. PCT/US2017/21023, dated Jun. 29, 2017, 12 pages.

*Primary Examiner* — Scott J. Chmielecki
(74) *Attorney, Agent, or Firm* — Dinsmore & Shohl LLP; Weston R. Gould

(57) ABSTRACT

The present application discloses s an electrochemical cell (battery) comprising a hydrogen storage negative electrode (anode), a positive electrode (cathode) and a solid proton-conducting electrolyte in contact with the electrodes. The solid proton-conducting electrolyte comprises a silicon material which comprises at least 35 at % silicon.

26 Claims, 1 Drawing Sheet

(51) Int. Cl.
*H01M 4/04* (2006.01)
*H01M 10/0562* (2010.01)
*H01M 4/131* (2010.01)
*H01M 4/136* (2010.01)
*H01M 4/1391* (2010.01)
*H01M 4/1397* (2010.01)
*H01M 4/36* (2006.01)
*H01M 4/50* (2010.01)
*H01M 4/58* (2010.01)
*H01M 4/60* (2006.01)
*H01M 4/66* (2006.01)
*H01M 10/0585* (2010.01)
*H01M 4/02* (2006.01)
*H01M 4/38* (2006.01)
*H01M 10/34* (2006.01)

(56) References Cited

U.S. PATENT DOCUMENTS

| | | |
|---|---|---|
| 4,404,268 A | 9/1983 | Imai et al. |
| 4,551,400 A | 11/1985 | Sapru et al. |
| 4,623,597 A | 11/1986 | Sapru et al. |
| 4,728,586 A | 3/1988 | Venkatesan et al. |
| 5,096,667 A | 3/1992 | Fetcenko |
| 5,366,831 A | 11/1994 | Watada et al. |
| 5,451,475 A | 9/1995 | Ohta et al. |
| 5,455,125 A | 10/1995 | Matsumoto et al. |
| 5,466,543 A | 11/1995 | Ikoma et al. |
| 5,489,314 A | 2/1996 | Bogauchi et al. |
| 5,498,403 A | 3/1996 | Shin |
| 5,506,069 A | 4/1996 | Ovshinsky et al. |
| 5,506,070 A | 4/1996 | Mori et al. |
| 5,536,591 A | 7/1996 | Fetcenko et al. |
| 5,552,242 A * | 9/1996 | Ovshinsky ............ H01M 6/18 429/152 |
| 5,554,456 A | 9/1996 | Ovshinsky et al. |
| 5,571,636 A | 11/1996 | Ohta et al. |
| 5,616,432 A | 4/1997 | Ovshinsky et al. |
| 5,840,440 A | 11/1998 | Ovshinsky et al. |
| 6,177,213 B1 | 1/2001 | Fetcenko et al. |
| 6,193,929 B1 | 2/2001 | Ovshinsky et al. |
| 6,228,535 B1 | 5/2001 | Fierro et al. |
| 6,270,719 B1 | 8/2001 | Fetcenko et al. |
| 6,536,487 B2 | 3/2003 | Ovshinsky et al. |
| 6,617,072 B2 | 9/2003 | Venkatesan et al. |
| 6,830,725 B2 | 12/2004 | Fetcenko et al. |
| 7,396,379 B2 | 7/2008 | Fetcenko et al. |
| 7,829,220 B2 | 11/2010 | Yoshida et al. |
| 8,053,114 B2 | 11/2011 | Magari et al. |
| 8,124,281 B2 | 2/2012 | Yoshida et al. |
| 8,257,862 B2 | 9/2012 | Katayama et al. |
| 8,409,753 B2 | 4/2013 | Yoshida et al. |
| 2002/0106456 A1 | 8/2002 | Kugai et al. |
| 2011/0059369 A1* | 3/2011 | Nan ............... H01M 10/0525 429/322 |
| 2012/0183835 A1 | 7/2012 | Young et al. |
| 2013/0084495 A1* | 4/2013 | Tajima ............. H01M 4/134 429/211 |
| 2013/0277607 A1 | 10/2013 | Young et al. |
| 2014/0127573 A1* | 5/2014 | Xiao ............. H01M 4/0426 429/211 |
| 2016/0141726 A1 | 5/2016 | Young et al. |
| 2016/0230255 A1 | 8/2016 | Young et al. |
| 2016/0233495 A1 | 8/2016 | Young et al. |
| 2016/0233500 A1 | 8/2016 | Young et al. |
| 2016/0233505 A1 | 8/2016 | Young et al. |
| 2016/0233506 A1 | 8/2016 | Young et al. |
| 2016/0329560 A1 | 11/2016 | Young et al. |

* cited by examiner

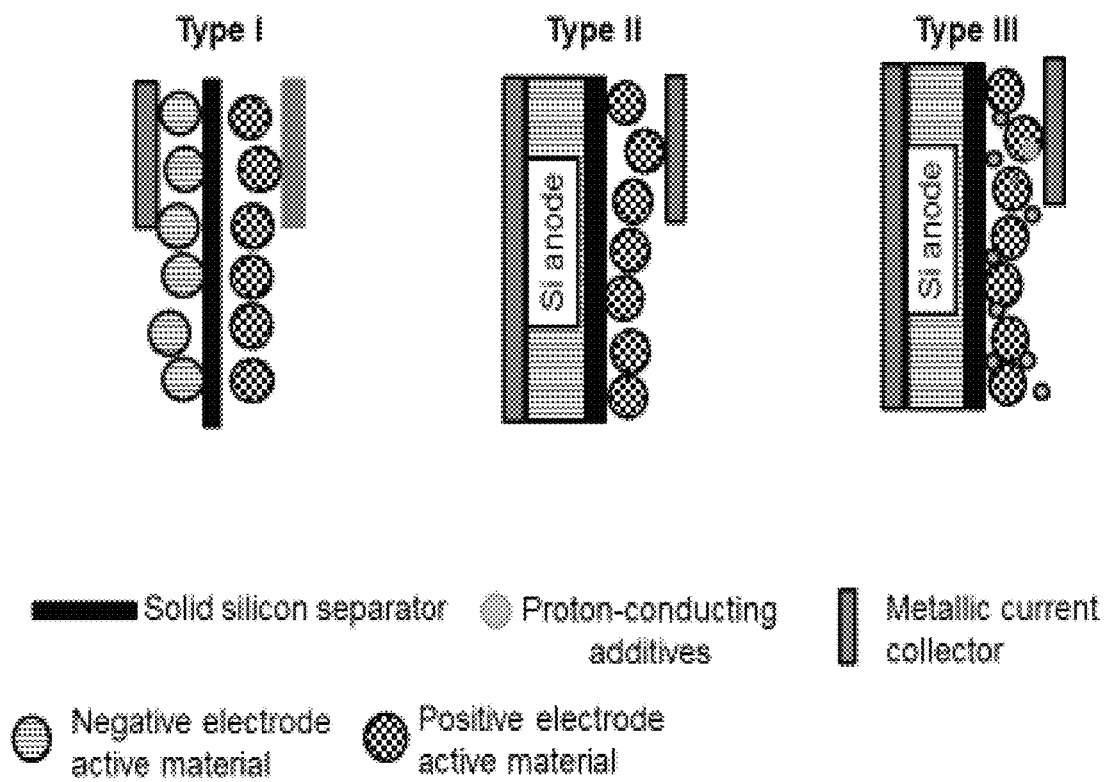

SILICON-BASED SOLID ELECTROLYTE FOR RECHARGEABLE BATTERY

FIELD OF THE INVENTION

The present invention is aimed at solid electrolyte in rechargeable batteries.

BACKGROUND OF THE INVENTION

The following US patent applications, US published applications and US patents are hereby incorporated by reference: 62/156,464, filed May 4, 2015; Ser. No. 14/614,838, filed Feb. 5, 2015;
Ser. No. 14/614,753, filed Feb. 5, 2015; Ser. No. 14/619,388, filed Feb. 11, 2015; Ser. No. 14/619,455, filed Feb. 11, 2015; Ser. No. 14/619,703, filed Feb. 11, 2015; U.S. Pat. Nos. 4,111,689; 4,160,014; 4,551,400; 4,623,597; 4,728,586; 5,096,667; 5,536,591; 5,554,456; 5,840,440; 6,270,719; 6,830,725; 6,536,487; 7,829,220; 8,053,114; 8,124,281; 8,257,862; 8,409,753; 2013/0277607; U.S. Pat. Nos. 5,506,069, 5,616,432; 6,193,929; 2013/0277607; U.S. Pat. Nos. 5,366,831; 5,451,475; 5,455,125; 5,466,543; 5,498,403; 5,489,314; 5,506,070; 5,571,636; 6,177,213; 6,228,535; 6,617,072; 7,396,379; and Ser. No. 14/540,537, filed Nov. 13, 2014.

Disclosed is an electrochemical cell (battery) comprising a hydrogen storage negative electrode (anode), a positive electrode (cathode) and a solid proton-conducting electrolyte in contact with the electrodes. The present electrochemical cells may for example, be termed "solid state proton batteries". Upon discharge, electrons exit the anode through external circuitry and protons exit the anode through the solid electrolyte composition.

The present electrochemical cells are rechargeable.

SUMMARY OF THE INVENTION

The invention embraces:

A rechargeable electrochemical cell comprising 1) an anode; 2) a cathode; and 3) a solid electrolyte comprising a silicon material comprising at least 35 at % silicon material, for example at least 40 at % silicon material or at least 45 at % silicon material said solid electrolyte disposed between the cathode and anode.

The solid electrolyte of the rechargeable cell does not typically further comprise a liquid or gel. One of the key advantages of the present solid electrolyte is it functions well as a proton conductor without the presence or penetration of a liquid or gel.

The silicon material can be for example in the form of intrinsic silicon (undoped silicon), crystalline silicon, amorphous silicon, polycrystalline silicon, microcrystalline silicon, nanocrystalline silicon, monocrystalline silicon, protocrystalline silicon, silicon carbide, silicon nitride or silicon oxide or porous silicon.

For example, the solid electrolyte composition may comprise a silicon material which is intrinsic silicon.

The invention further embraces a battery, for example a solid state battery comprising the electrochemical cell as described above, wherein the battery further includes an electrically conductive bottom and top battery terminal layers adjacent to the anode and cathode.

The invention also embraces a method of forming an electrochemical cell as described above, wherein the cell is formed comprising the step of incorporating a solid electrolyte between a cathode and an anode, wherein the solid electrolyte comprises at least 35 at % silicon material, for example at least 40 at % silicon material or at least 45 at % silicon material.

Further the invention embodies a use of a solid electrolyte as a proton conductor disposed between the cathode and anode of an electrochemical cell, wherein the solid electrolyte comprises at least 35 at % silicon material, for example at least 40 at % silicon material or at least 45 at % silicon material.

The solid electrolyte of the invention functions as a solid electrolyte that conducts protons. Because the electrolyte is solid and not a liquid, the need for the presence of a solid separator which separates the conventional liquid electrolyte from the electrodes is eliminated. In addition to the advantage of eliminating the need for a solid separator, the inventive solid electrolyte is more stable to higher operation temperature than conventional liquid or gel electrolytes, has higher packing density because of its physical state, has an ease of packing, no parasitic chemical reaction with for example the electrode active materials and no chemical degradation at battery operating temperatures.

BRIEF DESCRIPTION OF THE DRAWINGS

FIG. 1—Proposed Battery Cell Structures I, II and III.

DETAILED DESCRIPTION OF THE INVENTION

Definitions

Intrinsic Silicon

Intrinsic silicon is substantially pure silicon, that is the silicon has not been intentionally doped with other atoms for example group V or group III elements. The solid electrolyte may comprise intrinsic silicon, that is silicon which is substantially pure silicon.

Solid Electrolyte

The solid electrolyte functions as a good conductor of protons and has negligible electrical conductivity. The term "solid electrolyte" means the electrolyte is a solid at battery operating temperatures, for example at room temperature and up to 100, 200, 300, 500 or 1000° C.

The term "solid electrolyte" also means that the electrolyte is a solid and does not further comprise liquid or gel materials. The solid electrolyte may impinge upon the anode and cathode surfaces. The anode and cathode may comprise active electrode materials and liquid additives. These liquid additives may be directly adjacent to the solid electrolyte but cannot be considered as penetrating or part of the solid electrolyte.

An electrolyte is typically interposed between the cathode and the anode which is for instance a liquid or gel ensuring high ion (proton) transmission. When liquid or gel electrolytes are used, solid separators are also employed to prevent a direct contact (short circuit) between anode and cathode. Known separator materials included sheets or non-woven fabrics comprising materials including glass fiber, cotton, nylon, polyester, polyethylene, polypropylene, polyvinyl chloride, polytetrafluoroethylene and kraft paper.

The present inventive rechargeable electrochemical cell comprising 1) an anode; 2) a cathode; and 3) a solid electrolyte material comprising a silicon material at least 35 at % silicon, for example at least 40 at % silicon or at least 45 at % silicon, at least 50 at % silicon, at least 55 at % silicon, at least 60 at % silicon or at least 65 at % silicon, wherein the at % is based on the total atomic weight of the silicon material said solid electrolyte disposed between the cathode and anode.

The solid electrolyte material needs to contain at least 45 wt. % silicon material wherein the wt. % is based on the total weight of the solid electrolyte. The solid electrolyte material may comprise other ingredients in addition to the silicon material. For example such ingredients that come to mind are non-active binders polyvinyl alcohol (PVA, carboxymethylcellulose CMC), electron conductive grains (Ni, Co), hydrogen storage alloy (LaNi5, TiMn2) and hydrogen transport enhancers such as platinum group metals (for example Pd, Pt).

The solid electrolyte may contain at least 45 wt. % of a silicon material, for instance at least 45 silicon nitride. In this case the at % of silicon in the silicon material is ~58 at %.

The silicon material may be selected from the group consisting of intrinsic silicon (undoped silicon), crystalline silicon, amorphous silicon, polycrystalline silicon, microcrystalline silicon, nanocrystalline silicon, monocrystalline silicon, protocrystalline silicon, silicon carbide, silicon nitride, silicon oxide and porous silicon.

The inventors have discovered that a solid electrolyte comprising silicon material (amorphous silicon, microcrystalline silicon, nanocrystalline silicon, monocrystalline silicon, polycrystalline silicon, protocrystalline silicon and porous silicon) or certain silicon containing compounds can function as an efficient solid electrolyte. The inventive solid electrolyte when disposed between the anode and cathode is electrically insulating and capable of conducting or transporting protons from the cathode to the anode while the battery is charging and from the anode to the cathode while battery is discharging.

The silicon material may be a silicon compound such as for example SiO, SiN and SiC.

The solid state electrolyte comprises a silicon material which is at least 35 at % silicon, for example 40 at % silicon, 45 at % silicon, 50 at % silicon, 55 at % silicon, 60 at % silicon or 65 at % silicon.

At % is used to define the amount of silicon in the silicon material. The at % is based on the total atomic weight of the solid silicon material or the solid silicon compound. For example, if SiN is the solid electrolyte, silicon makes up about 58 at % of the SiN. If hydrogenated amorphous silicon forms the solid electrolyte, the at % of silicon is for example based on the total atomic weight of the hydrogenated amorphous silicon (silicon plus the incorporated hydrogen saturating silicon dangling bonds).

Amorphous or polycrystalline silicon often contain dangling, unsaturated bonds, which offer conducting paths for electrons. These conducting paths for electrons are undesired when silicon is used as a solid state electrolyte when disposed between an anode and cathode. However, these dangling bonds may be saturated with atoms/ions such as H, Li, F, N, B and C which eliminate the conduction pathways thus improving on the insulating properties of the amorphous and polycrystalline silicon layers. For example, the band gaps of amorphous silicon before and after hydrogenation are 1.1 and 1.8 Ev respectively. The increase in energy gap is evidence of reduction in the number of unsaturated dangling bonds in the amorphous silicon. Thus after saturation of allotropes of silicon such as amorphous silicon and polycrystalline silicon make good candidates for solid state electrolytes.

Silicon materials comprising dangling bonds may be saturated with atoms/ions such as H, Li, F, N, B and C which eliminate the conduction pathways before or after deposition of the silicon layer on the anode or cathode active material.

The upper range of at % silicon making up the silicon material is about 100 at %, about 98 at %, 95 at %, 92 at %, 90 at %, 85 at %, 80 at %. Accordingly the solid electrolyte comprises a silicon material which for example comprises at least 35 at % silicon to about 100 at % silicon, at least 40 at % silicon to about 98 at % silicon, at least 45 at % silicon to about 95 at % silicon or at least 50 at % silicon to about 95 at % silicon.

The solid electrolyte typically has an electrical resistivity >10 k Ωcm, >11 k Ωcm, >11 k Ωcm or >12 k Ωcm.

The solid electrolyte may for instance be a thin film silicon wafer ranging in thickness from 1 to 50 microns, for instance 1.5 microns to about 45 microns or 2 microns to about 40 microns. For example, 1 to 10 micron thick crystalline silicon wafers are commercially available.

The active electrode materials (cathode and/or anode) may be deposited directly on the solid electrolyte or the solid electrolyte may be deposited directly onto the active electrode materials. The deposition on to the solid electrolyte or solid electrolyte deposition may be accomplished via chemical vapor deposition (CVD), physical vapor deposition (PVD), plasma enhanced chemical vapor deposition techniques (PECVD), precipitation from solution, or sol gel process. The active electrode materials may be with or without binder conductive additives and other additives.

Solid State Battery

A solid-state battery is a battery that has both solid electrodes and solid electrolyte (the solid electrolyte in this case is functioning as an electrolyte having good ionic conductivity).

For example a solid-state battery is a battery that has at least one multilayered battery cell comprising: 1) a solid state layer of negative electrode material capable of adsorbing and desorbing protons during charge and discharge; 2) a solid state layer of positive electrode material capable of desorbing and adsorbing protons during charge and discharge; and 3) a solid electrolyte material disposed between the layer of positive electrode material and the layer of negative electrode material, where the material disposed between the positive material and the negative material is electrically insulating and capable of readily conducting or transporting protons from the layer of positive electrode material to the layer of negative electrode material while the battery is charging and from the layer of negative electrode material to the layer of positive electrode material while the battery is discharging.

The present invention embraces a solid state battery as defined above but also embraces a battery wherein the negative electrode and/or positive electrode is in a solid state such as a solid film but also wherein the negative electrode and/or positive electrode is in a liquid or gel form. For example, active positive electrode materials such as $MnO_2$, $Mn_2O_3$, $NiO_2$ can be suspended in a liquid film or gel wherein the gel or liquid comprises ionic liquids, ionic gels or additional proton-conducting liquid or gel additives which increase the contact surface to the solid electrolyte.

The Anode

The anode comprises a hydrogen storage material. The anode or negative electrode material is capable of adsorbing and desorbing protons during charge and discharge.

The active anode material may be an element, alloy, compound, or mixture capable of reversibly storing hydrogen with a potential lower than −0.5 V vs. the standard hydrogen reference electrode.

Of particular interest is an anode comprising for instance silicon, carbon, germanium or tin, for instance p-type silicon or graphite, which have high hydrogen storage capability (hydrogen-to-metal ratio>2). P-type silicon is for example silicon doped with Al, such as the silicon anodes described in PCT published application WO2016/178957 herein incorporated entirely by reference.

When the anode is comprised of silicon, the solid electrolyte and the anode are distinct mainly in the electrical conductivity. While the electrode material has to be electrically conductive, the solid electrolyte material has to be electrically non-conductive or insulating. For example, the silicon containing anode may be hydrogenated amorphous silicon and doped with Al. The solid electrolyte may also be hydrogenated amorphous silicon but it is not doped with foreign atoms.

Another group of active anode materials well known in the art may also comprise ABx type metal hydride (MH) hydrogen storage alloys. "A" is defined as a hydride forming element and "B" a weak or non-hydride forming element. "A" is in general a larger metallic atom with 4 or less valence electrons and B is in general a smaller metallic atom with 5 or more valence electrons. Suitable ABx alloys include those where x is from about 0.5 to about 5. These alloys are capable of reversibly absorbing (charging) and desorbing (discharging) hydrogen. For example, present alloys are capable of reversibly absorbing and desorbing hydrogen electrochemically at ambient conditions (25° C. and 1 atm).

ABx type alloys are for example of the categories (with simple examples), AB (HfNi, TiFe, TiNi), $AB_2$ ($ZrMn_2$, $TiFe_2$), $A_2B$ ($Hf_2Fe$, $Mg_2Ni$), $AB_3$ ($NdCo_3$, $GdFe_3$), $A_2B_7$ ($Pr_2Ni_7$, $Ce_2Co_7$) and $AB_5$ ($LaNi_5$, $CeNi_5$).

An extensive review of the known metal hydride materials useful in electrochemical cells is given in U.S. Pat. No. 5,096,667, the disclosure of which is herein incorporated by reference.

The negative electrode active metal hydride material may be made by a gas atomization process. Such a process can produce MH powder as small as 1-2 micron in size (see U.S. Pat. No. 7,131,597, the disclosure of which is herein incorporated by reference). These powders are suitable for large area printing techniques for electrode fabrication, i.e. screen printing, jet printing, etc. For example, the fine powder may be screen-printed onto a substrate with <1 percent conductive binder to form a 50 microns thick negative electrode.

In addition to the hydrogen storage materials, the anode may further include binders, conductive materials and/or other additives. The anode assemblies may include these mixtures (hydrogen storage materials, binders, conductive materials and other additives) in adherence to a substrate, for example, metal, glass, inorganics and plastic.

The binder assists in coupling the hydrogen storage material and the conductive material and the mixture to the current collector. Binders include poly(tetrafluoroethylene) (PTFE), a copolymer of acrylonitrile and butadiene (NBR), polyvinylidene fluoride (PvDF), polyvinyl alcohol, carboxy methyl cellulose (CMC), starch, hydroxy propyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber (SBR), fluorine rubber, copolymers thereof and mixtures thereof. Binders may be employed from about 1 to about 50 weight %, based on the total weight of the anode electrode assembly.

Conductive materials may make up from about 1 to about 20 weight %, based on the total weight of the anode electrode assembly. Conductive materials include graphitic materials such as natural graphite, artificial graphite, a carbon black such as acetylene black, Ketjen black, channel black, furnace black or lamp black, conductive fibers such as carbon fiber or metal fiber, metal powders such as carbon fluoride, aluminum or nickel powder, conductive metal oxides such as zinc oxide, potassium titanate or titanium oxide and other conductive materials such as polyphenylene derivatives.

A filler may be employed as a component for controlling expansion of the anode. Fillers include olefin-based polymers such as polyethylene or polypropylene and fibrous material such as glass fiber or carbon fiber.

The anode may consist of or consist essentially of the hydrogen storage material or, alternatively, the anode may comprise the hydrogen storage material and a substrate. For instance, the hydrogen storage material may be adsorbed on a substrate such as a metal, glass, plastic or inorganic substrate. Inorganic substrate includes graphite.

The active anode or negative electrode materials with binder and additives can be pasted onto the solid electrolyte. The positive electrode materials can be deposited directly on the solid electrolyte or the solid electrolyte can be deposited directly on the positive electrode materials via chemical vapor deposition (CVD), physical vapor deposition (PVD), plasma enhanced chemical vapor deposition techniques (PECVD), precipitation from solution or sol gel process. Alternatively, the solid electrolyte may be pasted or deposited directly on the anode.

The Cathode

The cathode is composed of active material with or without binder, conductive additives, proton conductive additives and other additives. The active material is typically an oxide/hydroxide or transition metal capable of changing oxidation state in the voltage window of 0.1 to 3.0 V vs. SHE (Standard Hydrogen Electrode) such as $Ni(OH)_2$, NiOOH, $NiO_2$, MnO2, $Mn_2O_3$, $MMnO_4$ (M is a cation) but there are many other cathode materials described in the art such as those listed below.

Examples of active cathode materials may comprise a multi-phase disordered nickel hydroxide material having at least one modifier. The at least one modifier is for instance a metal, a metallic oxide, a metallic oxide alloy, a metal hydride and/or a metal hydride alloy. For example, the modifier is one or more components selected from the group consisting of Al, Ba, Ca, F, K, Li, Mg, Na, Sr, Bi, Co, Cr, Cu, Fe, In, $LaH_3$, Mn, Ru, Sb, Sn, $TiH_2$, TiO, and Zn. Such materials are taught in U.S. Pat. No. 5,348,822.

Suitable cathode materials may comprise a disordered multi-phase nickel hydroxide matrix including at least one modifier, for example 3 modifiers, chosen from F, Li, Na, K, Mg, Ba, Ln, Se, Nd, Pr, Y, Co, Zn, Al, Cr, Mn, Fe, Cu, Zn, Sc, Sn, Sb, Te, Bi, Ru and Pb. Suitable cathode materials are taught for example in U.S. Pat. No. 5,637,423.

Cathode materials may comprise nickel hydroxide modified with one or more group II elements and Co in a solid solution state. Such materials are taught in U.S. Pat. No. 5,366,831.

The cathode active materials may comprise nickel hydroxide and one or more components selected from the group consisting of cobalt, cobalt hydroxide and cobalt oxide and a carbon powder. The cathode materials may further comprise a compound of Ca, Sr, Ba, Cu, Ag or Y, for example $Ca(OH)_2$, CaO, $CaF_2$, CaS, $CaSO_4$, $CaSi_2O_5$, $CaC_2O_4$, $CaWO_4$, $SrCO_3$, $Sr(OH)_2$, BaO, $Cu_2O$, $Ag_2O$, $Y_2(CO_3)_3$ or $Y_2O_3$. Suitable cathode materials are taught for instance in U.S. Pat. No. 5,451,475.

Cathode active materials may comprise a metal oxide and one or more of Co, Ca, Ag, Mn, Zn, V, Sb, Cd, Y, Sr, Ba and oxides of Ca, Sr, Ba, Sb, Y or Zn. The metal oxide is for example nickel oxide and or manganese oxide. Such active materials are taught in U.S. Pat. No. 5,455,125.

The cathode materials may contain nickel hydroxide and a further component selected from the group consisting of Y, In, Sb, Ba and Be and Co and/or Ca. Such materials are disclosed in U.S. Pat. No. 5,466,543.

Cathode materials may be prepared by reacting nickel sulfate and ammonium hydroxide to form a nickel ammonium complex; the complex is then reacted with sodium hydroxide to form nickel hydroxide. The method may provide nickel hydroxide comprising one or more of Co, Zn and Cd. These materials are taught in U.S. Pat. No. 5,498,403. Cathode active materials may comprise nickel hydroxide and cobalt oxyhydroxide as taught in U.S. Pat. No. 5,489,314.

Cathode materials may comprise nickel hydroxide, cobalt monoxide and elemental zinc as taught in U.S. Pat. No. 5,506,070.

The cathode materials may comprise nickel hydroxide, nickel powder, a second powder and at least one of cobalt, cobalt hydroxide and cobalt oxide. The second powder contains one or more of Ca, Sr, Ba, Cu, Ag and Y. Such materials are taught in U.S. Pat. No. 5,571,636.

The cathode active materials may comprise particles of nickel hydroxide or manganese hydroxide having at least partially embedded therein a conductive material. The conductive material may be for instance nickel, nickel alloys, copper, copper alloys; metal oxides, nitrides, carbides, silicides or borides; or carbon (graphite). These materials are disclosed in U.S. Pat. No. 6,177,213.

The cathode materials may comprise nickel hydroxide particles containing at least three modifiers selected from the group consisting of Al, Bi, Ca, Co, Cr, Cu, Fe, In, La, rare earths, Mg, Mn, Ru, Sb, Sn, Ti, Ba, Si, Sr and Zn. For example, nickel hydroxide particles may contain at least four modifiers, for instance, Ca, Co, Mg and Zn. Such materials are disclosed in U.S. Pat. No. 6,228,535.

The active cathode material for instance comprises nickel hydroxide and a carbon material such as graphite.

The cathode active material may contain nickel hydroxide and nickel oxyhydroxide as taught in U.S. Pat. No. 7,396,379.

Generally, cathode active material particles are formed in a sintered or pasted electrode. The pasted electrode may be made by mixing the material with various additives and/or binders and applying the paste to a conductive support. Preferably, one or more cobalt additives are added to the pasted electrode. The cobalt additives may include Co and/or CoO to enhance conductivity, improve utilization and reduce electrical resistance of the positive electrode.

Modified nickel hydroxide may contain one or more modifiers such as Co, Cd, Ag, V, Sb, Ca, Mg, Al, Bi, Cr, Cu, Fe, In, rare earths, Mn, Ru, Sn, Ti, Ba, Si, Sr or Zn. A suitable modified nickel hydroxide is $(Ni,Co,Zn)(OH)_2$, for instance in the form of a spherical powder. In modified nickel hydroxides, nickel generally is present at a level of ≥80 atomic percent, for instance ≥90 atomic percent, based on the metals.

According to the present invention, further cathode active materials are possible. Further cathode active materials include transition metals and their oxides, hydroxides, oxide/hydroxides and fluorides. For example, further cathode active materials include Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt and Au and their oxides, hydroxides, oxide/hydroxides and fluorides.

For example, further cathode active materials are selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au; oxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au; hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au; oxide/hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au and fluorides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au.

Further cathode active materials selected from the group consisting of metal oxides, metal hydroxides and metal oxide/hydroxides, nickel may be present at a level of ≤5, ≤10, ≤15, ≤20, ≤25, ≤30, ≤35, ≤40, ≤45, ≤50, ≤55, ≤60, ≤65, ≤70, ≤75, ≤80 or ≤85 atomic percent, for instance ≤90 atomic percent, based on the total metals of the metal oxides, metal hydroxides and metal oxide/hydroxides.

The positive electrode materials can be deposited directly on the solid electrolyte via chemical vapor deposition (CVD), physical vapor deposition (PVD), plasma enhanced chemical vapor deposition techniques (PECVD), precipitation from solution or sol gel process. Alternatively, the positive electrode materials can be pasted directly onto the solid electrolyte, for example a solid electrolyte such as a wafer of silicon.

The cathode active material may also comprise binders, polymeric binders or other functional additives such as conductive additives and proton conductive additives including protic and aprotic ionic liquids.

The polymeric binder is for example a thermoplastic organic polymer, for instance selected from the group consisting of polyvinyl alcohol (PVA), polyethylene oxide, polypropylene oxide, polybutylene oxide, methyl cellulose, carboxymethyl cellulose, hydroxyethyl cellulose, hydroxypropyl cellulose, hydroxypropylmethyl cellulose, polyethylene, polypropylene, polyisobutylene, polyvinyl chloride, polyvinyliden chloride, polyvinyliden fluoride, polytetrafluoroethylene (PTFE), fluorinated ethylene propylene (FEP), perfluroalkoxy (PFA), polyvinylacetate, polyvinyl isobutylether, polyacrylonitrile, polymethacrylonitrile, polymethylmethacrylate, polymethylacrylate, polyethylmethacrylate, allyl acetate, polystyrene, polybutadiene, polyisoprene, polyoxymethylene, polyoxyethylene, polycyclic thioether, polydimethylsiloxane, polyesters such as polyethylene terephthalate, polycarbonate and polyamide. Blends and copolymers of the above are also suitable. The polymeric binder may also be an elastomer or rubber such as styrene-butadiene copolymer, styrene-butadiene-styrene block copolymer, styrene-isoprene block copolymer, styrene-isoprene-styrene block copolymer, styrene-ethylene-styrene-butadiene block copolymer, styrene-ethylene-butadiene-styrene block copolymer or styrene-acrylonitrile-butadiene-methyl acrylate copolymer. Suitable active materials are taught for instance in U.S. Pat. No. 6,617,072.

The proton-conducting additives may be mixed with the positive electrode active material to increase the contact surface to the solid electrolyte. These additives may be in the form of dry solid powder or malleable plastic particles. Examples include hydrogenated doped-amorphous silicon, hydrogenated doped-polycrystalline Si, proton-conducting polymers such as NAFION, sulfonated PBI, phosphoric acid-doped polybenzimidazole (PBI), sulfonated polyether ether ketone (PEEK), solid acid in the form of $M_xH_y(AO_4)_z$ where M=Li, K, R, Cs and $NH_4$ and A=S, Se, P and $As_{[KY1]}$. Protic organic ionic plastic crystals (POIPCs) such as imidazolium methanesulfonate, 1,2,4-triazolium methanesulfonate, 1,2,4-triazolium perfluorobutanesulfonate, guanidinium nonaflate may be used as additives with the positive electrode active material. Furthermore, oxides and their composites, such as $SiO_2$ and its composite, $Al_2O_3$ and its composite, $Fe_2O_3$ and its composite, $TiO_2$ and its composite, $ZrO_2$ and its composite, MgO and its composite, $WO_3$ and its composite, $MoO_3$ and its composite, $NaHWO_6$ and its composite and any combination of two or more of the above mentioned items may be combined with the positive electrode active material.

Of particular interest are the proton conducting additives such as ionic compounds. These ionic compounds may be protic ionic compounds or aprotic ionic compounds or ionic liquids.

The protic ionic compound may be a protic ionic liquid such as ethylammonium nitrate, diethylmethylammonium trifluoromethanesulfonate (DEMA TfO), triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonium dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride or dimethylammonium bifluoride.

The aprotic ionic compound may be an aprotic ionic liquid such as tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethyldiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium tetrafluoroborate, 1-ethyl-3-methylimidazolium hexafluorophosphate, 1-butyl-3,5-dimethylpyridinium bromide, 1-ethyl-3-methylimidazolium bis(trifluoromethylsulfonyl) imide, 1-ethyl-3-methylimidazolium bis(pentafluoroethylsulfonyl)imide, 1-ethyl-2,3-dimethylimidazolium methylcarbonate, carboxymethyl-tributylphosphonium bis (trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis (trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl) pyridinium bis(trifluoromethylsulfonyl)imide, 1,3-bis (cyanomethyl)imidazolium chloride, 1,3-bis(cyanomethyl) imidazolium bis(trifluoromethylsulfonyl)imide, 1,3-bis (cyanopropyl)imidazolium chloride, 1,3-bis(3-cyanopropyl) imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluoromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate or 3-(triphenylphosphonio)propane-1-sulfonic acid tosylate.

Current Collectors

Electrodes are connected to the terminals located outside of the cell casing through current collectors.

Thus the inventive multilayered battery cell comprises: 1) an anode; 2) a cathode; and 3) a solid electrolyte comprising a silicon material comprising at least 35 at % silicon, for example 40 at % silicon or 45 at % silicon wherein the silicon material is selected from the group of materials consisting of intrinsic silicon (undoped silicon), crystalline silicon, amorphous silicon, polycrystalline silicon, microcrystalline silicon, nanocrystalline silicon, monocrystalline silicon, protocrystalline silicon, silicon carbide, silicon nitride or silicon oxide, porous silicon and mixtures thereof, said layer disposed between the cathode and anode further includes an electrically conductive bottom and top battery terminal layers adjacent to the anode and cathode.

The electrically conductive bottom and top battery terminal layers are typically formed from an electrically conductive metal selected from the group consisting of aluminum, nickel, copper and alloys, mixtures or composites thereof, for example aluminum.

Cell Construction

Well known battery cell constructions used for rechargeable batteries are for example, prismatic, cylindrical and button-shaped. Bipolar design is also well known and particularly applicable to the present electrochemical cell of the invention comprising the solid silicon electrolyte. The bipolar design comprises individual flat wafer cells constructed with contact faces, one positive electrode, a solid electrolyte and a negative electrode. For example, identical cells are stacked one on top of another so that the positive face of one cell make contact with the negative face of the adjacent cell resulting in a series connection of the cells. To complete the battery, current collecting contact sheets are placed on the end cells to serve as the positive and negative terminals of the battery and the entire stack is held in an outer battery housing. For example, see *Batteries* 2016, 2, 10 pages 1-26 which offers a comprehensive review of U.S. patents regarding cell construction of nickel/metal hydride batteries.

The invention embraces a number of embodiments.

E1. A rechargeable electrochemical cell comprising 1) an anode; 2) a cathode; and 3) a solid electrolyte material comprising silicon material which is at least 35 at % silicon, for example at least 40 at % silicon or at least 45 at % silicon, at least 50 at % silicon, at least 55 at % silicon, at least 60 at % silicon or at least 65 at % silicon, wherein the at % is based on the total atomic weight of the silicon material, said electrolyte material disposed between the cathode.

E2. The rechargeable electrochemical cell according to E1, wherein the solid electrolyte does not further comprise a liquid or a gel.

E3. The electrochemical cell according to either embodiment E1 or E2, wherein the silicon material ranges from at least 35 at % silicon to about 100 at % silicon, at least 38 at % to about 99 at % silicon, at least about 40 at % silicon to about 98 at % silicon, at least 45 at % silicon to about 95 at % silicon or at least 50 at % silicon to about 95 at % silicon.

E4. The electrochemical cell according to anyone of embodiments E1 to E3, wherein the silicon material is selected from the group consisting of intrinsic silicon (undoped silicon), crystalline silicon, amorphous silicon, polycrystalline silicon, microcrystalline silicon, nanocrystalline silicon, monocrystalline silicon, protocrystalline silicon, silicon carbide, silicon nitride, silicon oxide and porous silicon.

E5. The electrochemical cell according to any one of E1 to E4, wherein the solid electrolyte is electrically insulating and capable of conducting or transporting protons from the cathode to the anode while the cell is charging and from the anode to the cathode while cell is discharging.

E6. The electrochemical cell according to any one of E1 to E5, wherein the solid electrolyte has an electrical resistivity of >10 k Ωcm, >11 k Ωcm, >11 k Ωcm or >12 k Ωcm.

E7. The electrochemical cell according to any one of the preceding embodiments, wherein the silicon material is intrinsic silicon (undoped silicon), crystalline silicon, amorphous silicon, polycrystalline silicon or crystalline silicon.

E8. The electrochemical cell according to any one of the preceding embodiments wherein the silicon material is saturated to remove dangling bonds.

E9. The electrochemical cell according to embodiment E8, wherein the silicon material is saturated with atoms selected from the group consisting of H, Li, F, N, B and C.

E10. The electrochemical cell according to embodiment E9, wherein the silicon material is saturated with H, Li or F atoms, for example H atoms.

E11. The electrochemical cell according to any one of the preceding embodiments, wherein the solid electrolyte material is a thin film ranging in thickness from about 1 to about 50 microns, for instance about 1.5 microns to about 45 microns, about 2 microns to about 40 microns, for example about 1 to about 10 micron thick silicon wafers are commercially available.

E12. The electrochemical cell according to any one of the preceding embodiments, wherein the anode or the cathode is deposited on the solid electrolyte or the solid electrolyte is deposited on the anode or cathode by chemical vapor deposition, enhanced chemical vapor deposition techniques (PECVD), precipitation from solution or sol gel process.

E13. The electrochemical cell according to any one of the preceding embodiments, wherein the anode comprises a metal hydride or alloy of a metal hydride.

E14. The electrochemical cell according to any of the embodiments, wherein the anode is a material capable of reversibly storing hydrogen with a potential lower than −0.5 V vs. a standard hydrogen reference electrode.

E15. The electrochemical cell according to any one of embodiments E1 to E12 or E14, wherein the anode is silicon based, carbon based, germanium based or tin based or any mixture thereof, for instance P-type silicon or graphite.

E16. The electrochemical cell according to embodiment E15, wherein the anode is silicon-based.

E17. The electrochemical cell according to embodiment E16, wherein the silicon-based anode comprises >27 wt. % silicon and the wt. % is based on the total weight of the anode.

E18. The electrochemical cell according to any one of embodiment E15 to E17, wherein the anode is silicon and is a p-type silicon or hydrogenated silicon.

E19. The electrochemical cell according to embodiment E18, wherein the anode is p-type silicon and doped with an atom selected from the group consisting of alumina, phosphine, boron and mixtures thereof.

E20. The electrochemical cell according to any of the previous embodiments, wherein the cathode is an active material selected from the group consisting of transition metals, transition metal oxides, transition metal hydroxides, transition metal oxide/hydroxide and transition metal fluorides.

E21. The electrochemical cell according to embodiment E20 wherein the cathode further comprises binders, polymeric binders, other functional additives such as conductive additives and proton conductive additives including protic and aprotic ionic liquids.

E22. The electrochemical cell according to either embodiment E20 or E21, wherein the cathode active material is an oxide/hydroxide of transition metal capable of changing oxidation state in a voltage window of 0.1 to 3.0 V vs. a standard hydrogen reference electrode.

E23. The electrochemical cell according to any one of E1 to E22 wherein the anode is comprised in a film in adherence to a substrate, for example a substrate selected from metal, glass, inorganics and plastic or the cathode is comprised in a film in adherence to a substrate, for example a substrate selected from metal, glass, inorganics and plastic.

E24. A battery comprising the electrochemical cell according to any one of the preceding embodiments, wherein the battery further includes an electrically conductive bottom and top battery terminal layers adjacent to the anode and cathode.

E25. The battery according to embodiment E24, wherein the battery is a solid state battery.

E26. The battery of according to embodiment E25, wherein the electrically conductive bottom and top battery terminal layers are formed from an electrically conductive metal selected from the group consisting of aluminum, nickel, copper and alloys, mixtures or composites thereof.

E27. The battery of according to embodiment E26, wherein the electrically conductive bottom and top battery terminal layers are formed from aluminum.

E28. The battery according to any one of embodiments E24-E27 wherein the battery comprises more than one electrochemical cell according to any one of embodiments E1-E23.

E29. The battery according to embodiments E28, wherein the battery comprises a stack of electrochemical cells and is a bipolar design.

E30. A method of forming an electrochemical cell according to any one of embodiments E1 to E23, wherein the cell is formed comprising the step of incorporating a solid electrolyte between the cathode and the anode, wherein the solid electrolyte material comprises a silicon material which is at least 35 at % silicon, for example at least 40 at % silicon, at least 45 at % silicon, at least 50 at % silicon, at least 55 at % silicon, at least 60 at % silicon or at least 65 at % silicon, wherein the at % is based on the total atomic weight of the silicon material the solid electrolyte disposed between the cathode and anode.

E31. The method according to embodiment E30, wherein the solid electrolyte does not further comprise a liquid or gel.

E32. The method according to embodiment E31, wherein the silicon material is selected from the group consisting of intrinsic silicon (undoped silicon), crystalline silicon, amorphous silicon, polycrystalline silicon, microcrystalline silicon, nanocrystalline silicon, monocrystalline silicon, protocrystalline silicon, silicon carbide, silicon nitride, silicon oxide and porous silicon.

E33. Use of a solid electrolyte disposed between the cathode and anode of a battery, wherein the solid electrolyte material comprises a silicon material which is least 35 at % silicon, for example at least 40 at % silicon, at least 45 at % silicon, at least 50 at % silicon, at least 55 at % silicon, at least 60 at % silicon or at least 65 at % silicon, wherein the at % is based on the total atomic weight of the silicon material said solid electrolyte disposed between the cathode and anode.

E34. The use according to embodiment E33, wherein the solid electrolyte does not further comprise a liquid or gel.

E35. The use of a solid electrolyte according to embodiment E32 where the silicon material is selected from the group consisting of intrinsic silicon (undoped silicon), crystalline silicon, amorphous silicon, polycrystalline silicon, microcrystalline silicon, nanocrystalline silicon, monocrystalline silicon, protocrystalline silicon, silicon carbide, silicon nitride, silicon oxide and porous silicon The terms "a" or "an" referring to elements of an embodiment may mean "one" or may mean "one or more".

The term "about" refers to variation that can occur, for example, through typical measuring and handling procedures; through inadvertent error in these procedures; through differences in the manufacture, source, or purity of ingredients used; through differences in methods used; and the like. The term "about" also encompasses amounts that differ due to different equilibrium conditions for a composition resulting from a particular initial mixture. Whether or not modified by the term "about," embodiments and claims include equivalents to the recited quantities.

All numeric values herein are modified by the term "about," whether or not explicitly indicated. The term "about" generally refers to a range of numbers that one of skill in the art would consider equivalent to the recited value (i.e., having the same function and/or result). In many instances, the term "about" may include numbers that are rounded to the nearest significant figure.

A value modified by the term "about" of course includes the specific value. For instance, "about 5.0" must include 5.0.

The term "consisting essentially of" means that the composition, method or structure may include additional ingredients, steps and/or parts, but only if the additional ingredients, steps and/or parts do not materially alter the basic and novel characteristics of the claimed composition, method or structure.

EXAMPLE

Formation of Anode

Hydrogenated amorphous Si is deposited onto a 10 micron thick aluminum foil via chemical vapor deposition. For details please refer to specific examples 1-3 of published PCT WO2016/178957 herein incorporated entirely by reference.

Deposition of Solid Electrolyte

On top of the formed silicon containing anode, a 2 micron thick silicon nitride solid electrolyte layer is deposited by chemical vapor deposition to form a solid electrolyte layer.

Formation of Cathode

A paste of MnO2 spherical particles (average diameter of 30 microns) and the ionic liquid 1-ethyl-3-methylimidazolium acetate is formed and pasted on top of the silicon nitride solid electrolyte.

A top aluminum layer (10 microns thick) is placed on top of the cathode to enclosed the cell. The whole process can be carried out in a role-to-role machine.

The above example forms a type III battery structure illustrated in FIG. 1.

As seen in FIG. 1, there are three slightly different electrochemical cell variations. Applicants are not limited to these illustrative examples. Types I, II and III illustrate an anode and cathode with a solid electrolyte disposed between. The differences between the types of electrochemical cells vary in the composition of the anode and cathode materials. In Types II and III the anode is a solid silicon comprising material (for example as defined in WO examples 1-3 of published PCT WO2016/178957). The cathode materials in types I, II and III can be any known type of active cathode materials in any physical form such as paste, gel, suspension, sintered solid, powder etc. The active anode materials, active cathode materials and solid electrolyte materials for each type of cell variations may contain additional additives.

The invention claimed is:

1. A rechargeable electrochemical cell comprising 1) an anode; 2) a cathode; and 3) a solid electrolyte material comprising a silicon material wherein:
the silicon material is at least 35 at % silicon, the silicon material is amorphous silicon or polycrystalline silicon and the amorphous silicon or polycrystalline silicon is saturated to remove dangling bonds,
said solid electrolyte disposed between the cathode and anode.

2. The rechargeable electrochemical cell according to claim 1, wherein the solid electrolyte does not further comprise a liquid or gel.

3. The electrochemical cell according to claim 1, wherein the solid electrolyte is electrically insulating and capable of conducting or transporting protons from the cathode to the anode while the cell is charging and from the anode to the cathode while cell is discharging.

4. The electrochemical cell according to claim 1, wherein the solid electrolyte has an electrical resistivity >10 k $\Omega$cm.

5. The electrochemical cell according to claim 1, wherein the silicon material is saturated with atoms selected from the group consisting of H, Li, F, N, B and C.

6. The electrochemical cell according to claim 5, wherein the silicon material is saturated with H Li, or F atoms.

7. The electrochemical cell according to claim 1, wherein the solid electrolyte is a thin film ranging in thickness from 1 to 50 microns.

8. The electrochemical cell according to claim 1, wherein anode or the cathode is deposited on the solid electrolyte or the solid electrolyte is deposited on the anode or cathode by chemical vapor deposition, enhanced chemical vapor deposition techniques (PECVD), precipitation from solution or sol gel process.

9. The electrochemical cell according to claim 1, wherein the anode comprises a metal hydride or alloy of a metal hydride.

10. The electrochemical cell according to claim 1, wherein the anode is a material capable of reversibly storing hydrogen with a potential lower than −0.5 V vs. a standard hydrogen reference electrode.

11. The electrochemical cell according to claim 1, wherein the anode is silicon based, carbon based, germanium based or tin based or any mixture thereof, for instance p-type silicon, n-type silicon, or graphite.

12. The electrochemical cell according to claim 11, wherein the anode is silicon-based.

13. The electrochemical cell according to claim 12, wherein the silicon-based anode comprises >27 wt. % silicon and the wt. % is based on the total weight of the anode.

14. The electrochemical cell according to claim 12, wherein the anode is silicon and is a p-type, n-type silicon or hydrogenated silicon.

15. The electrochemical cell according to claim 14, wherein the anode is p-type or n-type silicon and doped with an atom selected from the group consisting of alumina, phosphine, boron and mixtures thereof.

16. The electrochemical cell according to claim 1, wherein the cathode is an active material selected from the group consisting of transition metals, transition metal oxides, transition metal hydroxides, transition metal oxide/hydroxide and transition metal fluorides.

17. The electrochemical cell according to claim 16 wherein the cathode further comprises one or more binders, polymeric binders, conductive additives, proton conductive additives, protic and aprotic ionic liquids.

18. The electrochemical cell according to claim 16, wherein the cathode active material is an oxide/hydroxide of transition metal capable of changing oxidation state in a voltage window of 0.1 to 3.0 V vs. a standard hydrogen reference electrode.

19. The electrochemical cell according to claim 1 wherein the anode is comprised in a film in adherence to a substrate, for example a substrate selected from metal, glass, inorganics and plastic or the cathode is comprised in a film in adherence to a substrate, for example a substrate selected from metal, glass, inorganics and plastic.

20. A battery comprising the electrochemical cell according to claim 1, wherein the battery further includes an electrically conductive bottom and top battery terminal layers adjacent to the anode and cathode.

21. The battery according to claim 20, wherein the battery is a solid state battery.

22. The battery of claim 20, wherein the electrically conductive bottom and top battery terminal layers are independently formed from an electrically conductive metal selected from the group consisting of aluminum, nickel, copper and alloys, mixtures or composites thereof.

23. The battery of claim 22, wherein the electrically conductive bottom and top battery terminal layers are formed from aluminum.

24. The battery according to claim 20, wherein the battery comprises more than one electrochemical cell.

25. The battery according to claim 24, wherein the battery comprising a stack of electrochemical cells and is a bipolar design.

26. A method of forming an electrochemical cell according to claim 1, wherein the cell is formed comprising the step of incorporating a solid electrolyte between the cathode and the anode.

* * * * *